(12) United States Patent
Murar et al.

(10) Patent No.: US 6,761,364 B2
(45) Date of Patent: Jul. 13, 2004

(54) PLASTIC SHOPPING CART

(75) Inventors: Jason T. Murar, Detroit, MI (US); Jeffrey M. Stribbell, Rochester Hills, MI (US); Donald L. Wilson, Jr., Waterford, MI (US); William G. Hoffman, Grosse Point Park, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 10/100,763

(22) Filed: Mar. 19, 2002

(65) Prior Publication Data

US 2003/0057666 A1 Mar. 27, 2003

Related U.S. Application Data (63) Continuation-in-part of application No. 09/812,930, filed on Mar. 20, 2001, now abandoned.

(51) Int. Cl.$^7$ .............................................. B62B 3/10
(52) U.S. Cl. ............................ 280/33.991; 280/33.992
(58) Field of Search ..................... 280/33.991, 33.992, 280/33.993, 33.994, 33.996, 33.997, 47.34, 79.2, 651; 297/256.17

(56) References Cited

U.S. PATENT DOCUMENTS

| | | | | |
|---|---|---|---|---|
| 2,419,422 A | * | 4/1947 | Schulein ...................... | 280/651 |
| 3,015,494 A | | 2/1962 | Fosbrook, Sr. | |
| 3,614,133 A | * | 10/1971 | Ganci et al. ............ | 280/33.991 |
| 4,647,055 A | | 3/1987 | Weill | |
| 4,746,134 A | | 5/1988 | Rehrig | |
| 5,203,578 A | * | 4/1993 | Davidson et al. ...... | 280/33.991 |
| 5,348,323 A | | 9/1994 | Trubiano | |
| 5,368,318 A | | 11/1994 | Rehrig et al. | |
| 5,385,387 A | | 1/1995 | Kain | |
| 5,441,288 A | * | 8/1995 | Rehrig .................. | 280/33.991 |
| 6,003,894 A | | 12/1999 | Maher | |
| 6,086,073 A | | 7/2000 | Tisbo et al. | |
| 6,155,580 A | | 12/2000 | Symons | |
| 6,488,292 B2 | * | 12/2002 | O'Quin .................. | 280/33.991 |

FOREIGN PATENT DOCUMENTS

| | | | | |
|---|---|---|---|---|
| DE | 1505798 | * | 4/1969 | ............ 280/33.991 |
| DE | 38 25 596 A | | 5/1989 | |
| DE | 89 03 541 U | | 5/1989 | |
| DE | 3841004 | | 6/1990 | |
| DE | 4317228 | * | 12/1993 | ............ 280/33.992 |
| FR | 2421783 | * | 12/1979 | ................. 280/651 |
| GB | 2 284 985 A | | 6/1995 | |
| WO | 93/01077 | | 1/1993 | |
| WO | 93/02903 | | 2/1993 | |

* cited by examiner

Primary Examiner—Frank Vanaman
(74) Attorney, Agent, or Firm—Welsh & Katz, Ltd.

(57) ABSTRACT

A plastic shopping cart is disclosed. In accordance with certain aspects of the present invention, all of the components of a shopping cart are formed from a moldable material such as, for example, a thermoplastic resin by means of an injection molding process or the like. The shopping cart is configured so that any metallic parts that are used to connect the various plastic components together are shielded from the ambient environment. This virtually eliminates any rusting and corrosion of any metallic parts that are used to connect the various components of the shopping cart together.

14 Claims, 12 Drawing Sheets

PLASTIC SHOPPING CART

CROSS-REFERENCE TO RELATED APPLICATION DATA

This application is a continuation-in-part of U.S. patent application Ser. No. 09/812,930, filed Mar. 20, 2001, now abandoned.

FIELD OF THE INVENTION

The present invention generally relates to shopping carts and, more particularly, to a shopping cart the components of which are formed from a moldable material such as a thermoplastic resin via an injection molding process.

BACKGROUND OF THE INVENTION

Shopping carts are relatively well known in the art, and are configured in a wide-variety of forms. Typical shopping carts comprise a metal frame, four rolling casters that support the metal frame, and an attached basket that is formed from either metal or plastic.

As one example, U.S. Pat. No. 4,123,077 to Joesph discloses a goods transport cart with molded plastic panels. The patent states that a basket is made from molded plastic panels, is caster mounted, and comprises a lower horizontal frame supporting an ossature of the basket. The ossature comprises a pair of rear uprights, a bottom panel, a front panel, and a pair of lateral vertical panels. The panels have a perforated or mesh structure, as stated in the patent. The content of this patent is incorporated by reference into this application as if fully set forth herein.

In yet another example, U.S. Pat. No. 4,537,413 to Rehrig discloses a plastic basket for use with a cart having front and rear baskets. The patent states that the baskets are manufactured from a plastic material. The rear basket is positioned behind the front basket and may be secured to horizontal frame of the cart chassis by bolts or other fastening means such as rivets. The content of this patent is incorporated by reference into this application as if fully set forth herein.

U.S. Pat. No. 4,632,411 to Badger discloses a shopping cart with a plastic basket. The patent states that a wheeled base assembly is constructed primarily from metal tubing, a separate handle assembly is constructed form metal tubing, and a one-piece plastic basket is rigidly to secured to the base and handle assembly. The basket member is molded in one piece entirely of a plastic material. The one-piece plastic basket is positioned on the base assembly and fixedly attached to both the base and handle assemblies. The content of this patent is incorporated by reference into this application as if fully set forth herein.

U.S. Pat. No. 4,746,134 to Rehrig discloses a plastic wheeled cart chassis having a reinforced structure. This patent states that a reinforced plastic wheeled cart chassis is used with a bottom-supported plastic basket having a downwardly facing basket mounting portion. The content of this patent is incorporated by reference into this application as if fully set forth herein.

As another example, U.S. Pat. No. 4,946,059 to Rehrig discloses a reinforced plastic basket. The patent states that a reinforcing ring is disposed around the upper edges of a plastic container to provide additional strength. The content of this patent is incorporated by referenced into this application as if fully set forth herein.

U.S. Pat. Nos. 5,255,930 and 5,289,936 to Jones et al. both disclose a shopping cart having a plastic basket. These patents state that the basket comprises separate side, front and bottom panel members that are molded from a suitable plastic and that are assembled without need for a basket frame. The patents further state that the wheeled chassis comprises a main frame made from steel tubing that is bent to form two portions extending longitudinally. The wheeled chassis also comprises an intermediate brace made from steel tubing that is bent to form two side portions, each being welded to one of the side portions of the main frame. The content of both of these patents is incorporated by reference into this application as if fully set forth herein.

As another example, U.S. Pat. No. 5,287,594 discloses a shopping cart swivel yoke assembly with plastic bearing racers. The patent states that the yoke assembly is of the type having a steel yoke with forks which support a wheel. The patent further states that the yoke is permitted to swivel because it is supported between an upper and lower set of ball bearings. The content of this patent is incorporated by reference into this application as if fully set forth herein.

U.S. Pat. No. 5,791,666 to Mainard discloses a shopping cart having clips that are used to fasten a plastic basket to a wheeled chassis. The patent states that the wheeled chassis comprises a main frame made from steel tubing that is bent to form two side portions. The content of this patent is incorporated by reference into this application as if fully set forth herein.

U.S. Pat. No. 5,794,952 to Kern et al. discloses a support assembly for a plastic basket of a shopping cart. The shopping cart includes a basket made of plastic, which is attached to a frame by a pair of basket support members, as stated in the patent. The patent states that the basket support member is a rod that includes a first end portion extending within an opening. The content of this patent is incorporated by reference into this application as if fully set forth herein.

U.S. Pat. No. 5,794,953 to Duchene et al discloses a shopping cart with an advertising card mounted to a plastic basket. The patent states that the shopping cart includes a wheeled chassis, a handle structure, and a basket that is fastened to the wheeled chassis and to the handle structure. The patent states that an advertising card is fastened to a selected panel by certain mechanical fasteners. The content of this patent is incorporated by reference into this patent as if fully set forth herein.

U.S. Pat. No. 5,865,448 to Kern et al discloses an integrally molded gate support for plastic shopping cart baskets. The patent states that the cart is generally formed from a tubular frame, and that the cart includes a plastic basket. The basket is adapted to be support by frame and directly engages rear upstanding supports and intermediate upstanding supports. The content of this patent is incorporated by reference into this application as if fully set forth herein.

U.S. Pat. No. 5,947,313 discloses a molded plastic basket and rear panel for shopping cart. The patent states that the molded plastic basket includes side and front walls formed of a molded gridwork of ribs extending at an angle. The content of this patent is incorporated by reference into this application as if fully set forth herein.

The products described above likely are suitable for their intended uses. However, most shopping carts that are in use today are formed from a metal material, or include a significant number of metal components that can rust and become unusable after a period of time of being exposed to inclement weather. In this case, the cart typically is thrown away, and usually placed in a dump. Thus, a need exists for providing a shopping cart that can be easily manufactured from a number of plastic components, all of which can be recycled after the life span of the cart expires.

SUMMARY OF THE INVENTION

It is desirable to provide a shopping cart all of the components of which are formed from a moldable material such as, for example, a thermoplastic resin by means of an injection molding process or the like. The shopping cart is configured so that any metallic parts that are used to connect the various plastic components together are generally shielded from the ambient environment.

Providing such a plastic shopping cart has a number of distinct advantages. First, the shopping cart is very stable. Second, each component of the shopping cart is readily replaceable. Third, rusting and corrosion of such a shopping cart is virtually eliminated due to the fact that the shopping cart is formed from plastic, and any metallic components are shielded from the ambient environment. Fourth, after the useful life of the cart has expired, the plastic components of the shopping cart can be recycled.

Other features and advantages of the invention will become apparent from the description that follows.

BRIEF DESCRIPTION OF THE DRAWINGS

The objects and advantages of the present invention will become more readily apparent to those of ordinary skill in the relevant art after reviewing the following detailed description and accompanying drawings, wherein.

DETAILED DESCRIPTION

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("Detailed Description Of The Invention") relates to a requirement of the United States Patent Office, and should not be found to be limiting to the subject matter disclosed and claimed herein.

Figure 1:
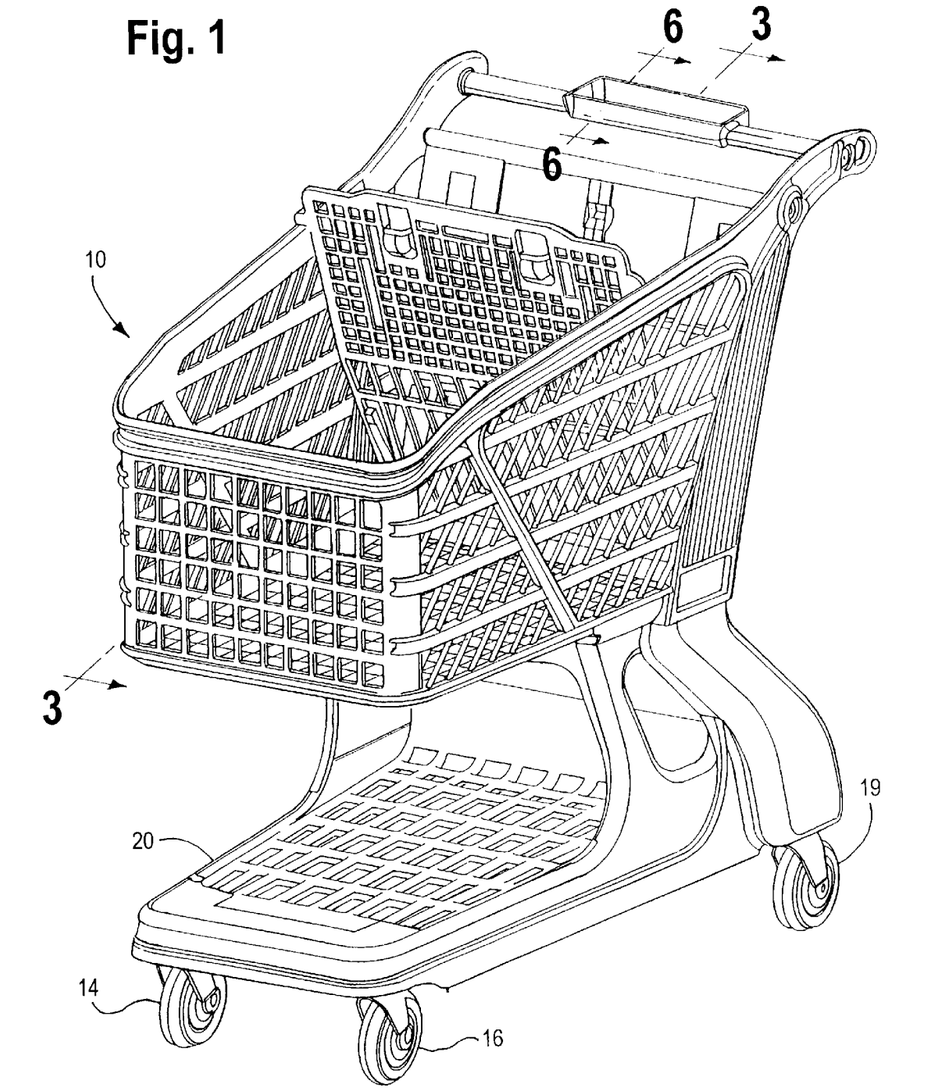
FIG. 1 is a perspective view of one embodiment of a plastic shopping cart 10 that is manufactured in accordance a number of aspects of the present invention.

Referring now to the drawings, FIG. 1 is a perspective view of one embodiment of a plastic shopping cart 10 that is manufactured in accordance a number of aspects of the present invention. The plastic shopping cart 10 comprises a number of distinct components each of which is formed from a moldable material such as, for example, a thermoplastic resin via an injection molding process. Forming the shopping cart 10 in this manner provides a sturdy, stable structure for transporting heavy goods or products. The plastic shopping cart 10 is comprised of easily replaceable components, which reduces the cost of maintenance. In addition, because the components are plastic, the plastic shopping cart will not rust, and may be recycled after the useful life of the cart has expired.

Figure 2:
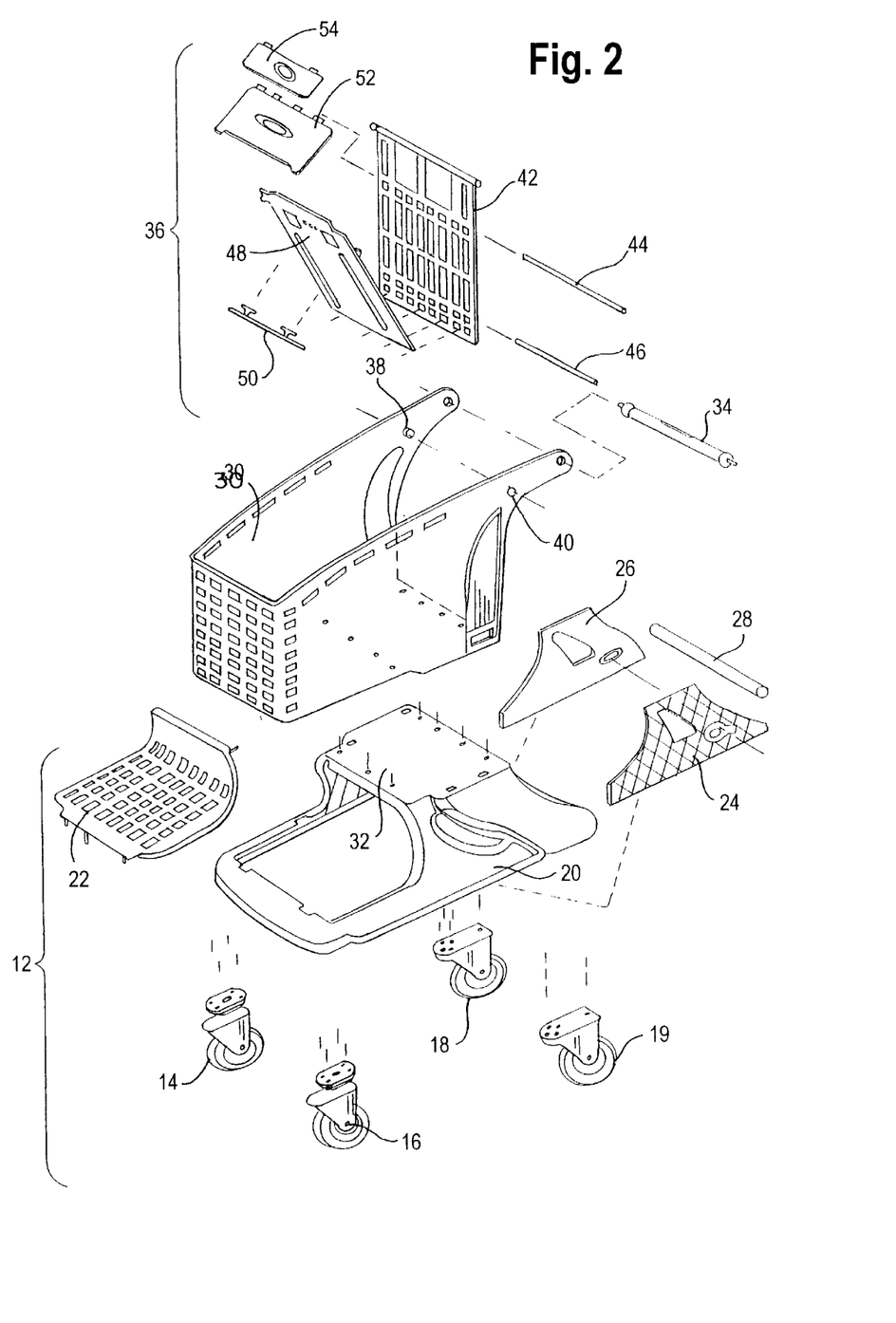
FIG. 2 is an exploded view of plastic shopping cart 10 shown in FIG. 1.

FIG. 2 is an exploded view of plastic shopping cart 10 shown in FIG. 1. The plastic shopping cart 10 includes a base assembly 12 that includes two swivel caster wheels 14 and 16, two fixed caster wheels 18 and 19, and a chassis 20. The caster wheels are affixed to the chassis 20 by means of suitable fasteners, enable the plastic shopping cart 10 to be easily maneuvered, and are designed to support loads of up to several hundred pounds. In one embodiment, four screws are utilized to secure each caster wheel to the chassis 20. The base assembly 12 also includes a bottom carrier 22, two close-out panels 24 and 26, and a cross-member 28, all of which are secured to the chassis 20. The bottom carrier 22 provides the shopping cart 10 with additional space for the undercarriage storage of goods.

A plastic basket 30 is mounted on the base assembly 12 as shown. In the illustrated embodiment of the present invention, eight fasteners such as, for example, screws are utilized to secure the plastic basket 30 onto an upper surface 32 of the chassis 20. A handle 34 is attached to an upper, rear portion of the plastic basket 30 to allow a user to move the plastic shopping cart over the ground.

Plastic shopping cart 10 also includes a gate and seat assembly 36 that is pivotably attached to the plastic basket at apertures 38 and 40. In the illustrated embodiment of the invention, gate and seat assembly 36 includes a swing gate 42, two aluminum rods 44 and 46, a back rest 48, seat bracket 50, a seat 52, and a flip top 54. The back rest 48 is pivotable with respect to the swing gate 42 about the axis of aluminum rod 46. The seat 52 and the flip top 54 are pivotable about the axis of aluminum rod 44.

Figure 3:
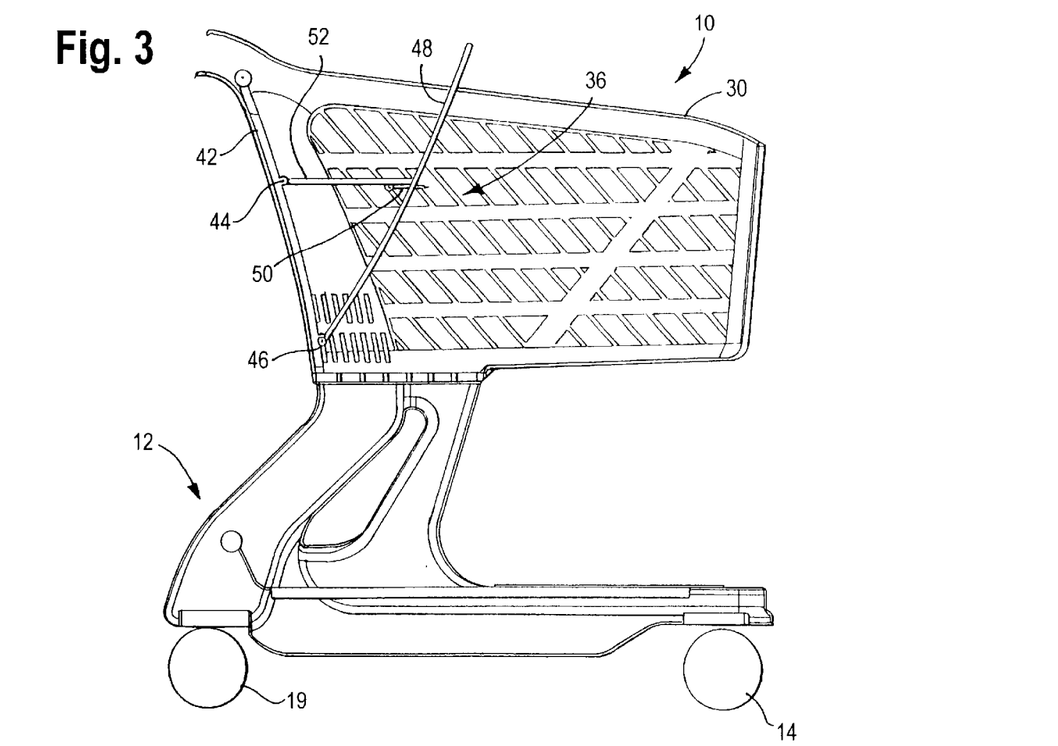
FIG. 3 is a section view of shopping cart 10 taken along line 3—3 in FIG. 1.

A section view of a portion of the plastic shopping cart 10 taken along line 3—3 in FIG. 1 is shown in FIG. 3. In accordance with one aspect of the present invention disclosed herein, the gate and seat assembly 36 are pivotable about an axis defined between apertures 38 and 40 as, for example, shown in FIGS. 5A–5D to allow multiple carts to be nested together and easily maneuvered as discussed in greater detail hereafter.

Figure 4:
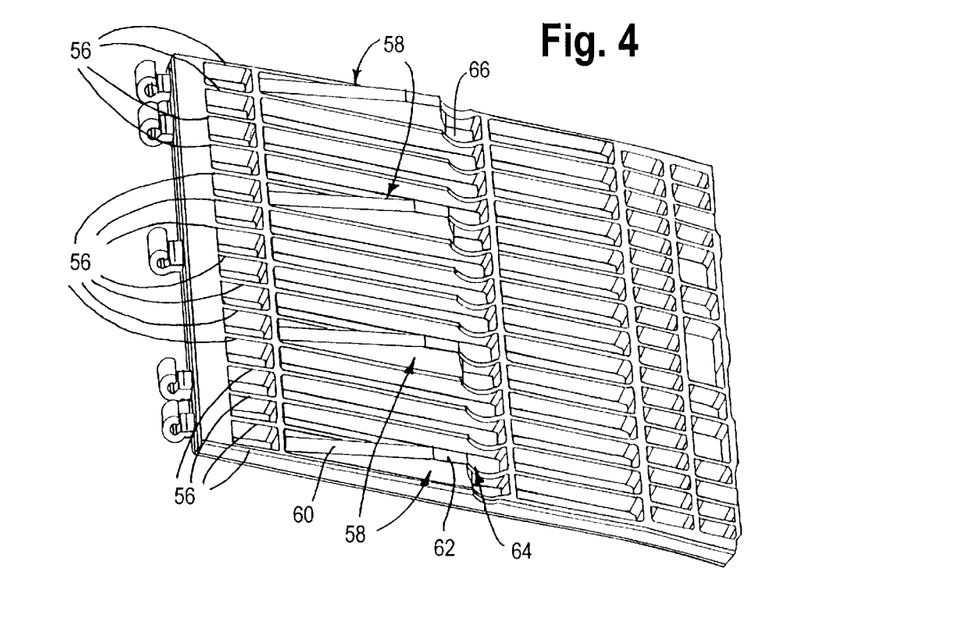
FIG. 4 is a perspective view of swing gate 42 shown in FIG. 2.

Referring to FIG. 4, a perspective view of swing gate 42 shown in FIG. 2 is illustrated. In the illustrated embodiment of the present invention, swing gate 42 includes fifteen support members 56 that are generally perpendicular to the axis of the aluminum rods 44 and 46 as well as the axis defined by the handle 34. Four cam members 58 are disposed in between adjacent pairs of the support members 56 as shown. Each one of the cam members 58 include an inclined portion 60, an intermediate portion 62, and a curved end portion 64. A notch portion 66 is defined in each one of the support members 56. The curved end portion 64 of each cam member 58 is configured for engagement with a handle portion of an additional shopping cart so that when at least three shopping carts are nested together, the rear caster wheels of all of the nested carts other than the rear two carts are lifted off there the ground, thereby allowing the nested shopping cart assembly to be easily maneuvered as discussed in greater detail hereafter.

Figure 5A:
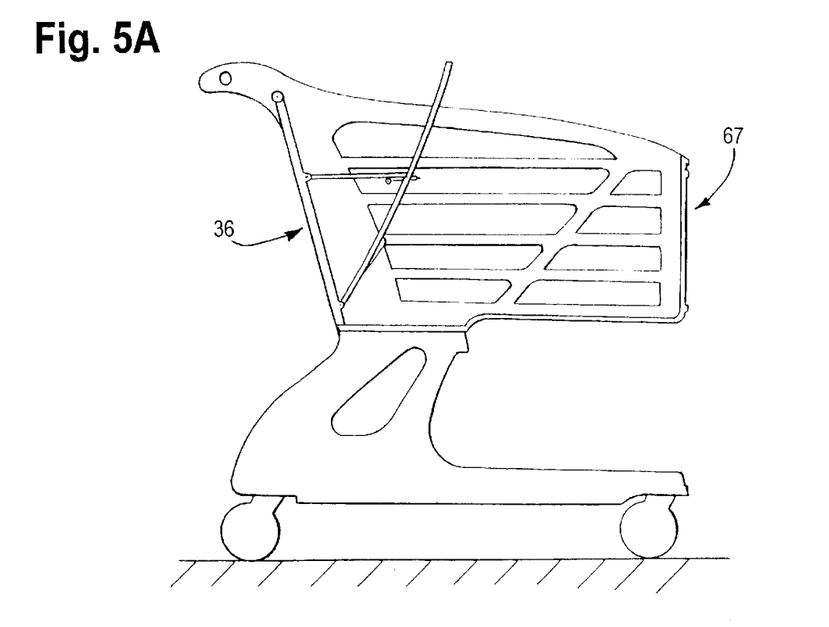
FIG. 5A is a side view of a plastic shopping cart 66 in which the gate and seat assembly 36 is disposed in an at-rest position.
Figure 5B:
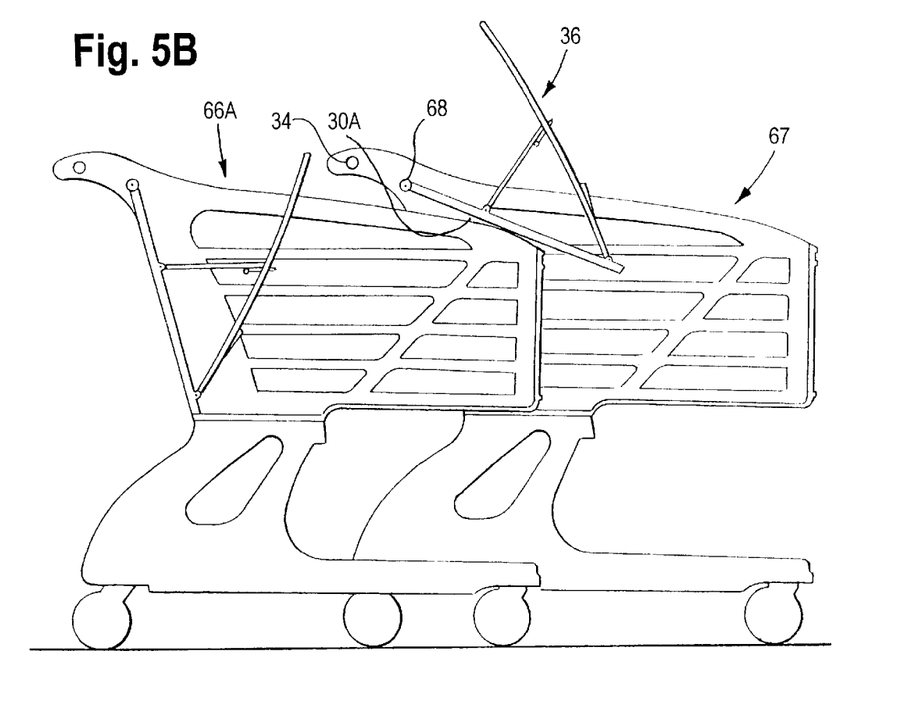
FIG. 5B is a side view of plastic shopping cart 66A that is partially nested in the plastic shopping cart 66 shown in FIG. 5A.
Figure 5C:
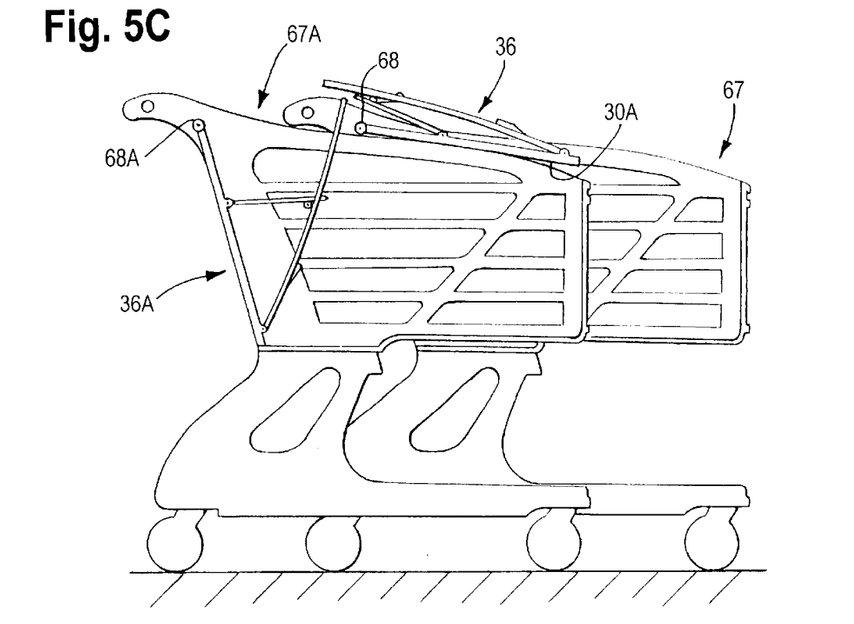
FIG. 5C is a side view of two shopping carts 66 and 66A that are fully nested together.

Referring to FIG. 5A, a side view of a plastic shopping cart 67, in which the gate and seat assembly 36 is disposed in an at-rest position is shown. FIG. 5B is a side view of a plastic shopping cart 67A that is partially nested inside the plastic shopping cart 67 shown in FIG. 5A. In this position, the front portion of the plastic basket 30A of plastic shopping cart 67A causes the gate and seat assembly 36 of shopping cart 67 to be rotated about the axis defined by member 68. Referring to FIG. 5C, plastic shopping carts 67 and 67A are fully nested together. In this case, the front portion of the plastic basket 30A of plastic shopping cart 67A supports the gate and seat assembly 36 in the fully raised position shown.

Figure 5D:
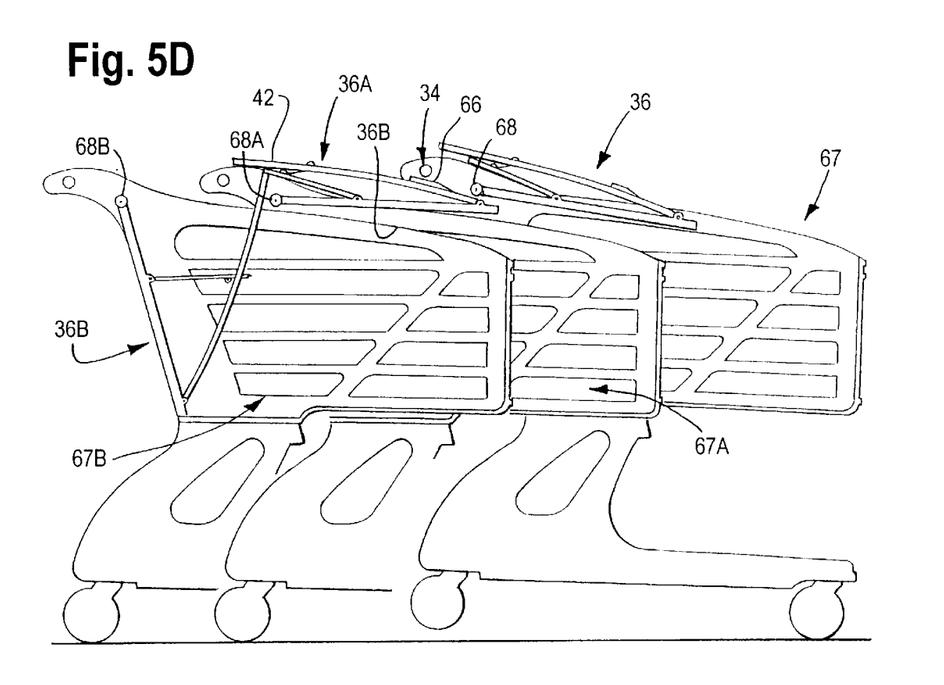
FIG. 5D is a side view of a third shopping cart 66B that is fully nested inside the nested pair of shopping carts 66 and 66A shown in FIG. 5C that causes the rear caster wheels 18 and 20 of shopping cart 66 to be lifted off the ground.

FIG. 5D is a side view in which a third shopping cart 66B is fully nested inside the nested pair of shopping carts 67 and 67A shown in FIG. 5C. The action of inserting plastic shopping cart 67B into a fully nested configuration with shopping cart 67A proceeds in accordance with that discussed above with regard to FIGS. 5A–5C. In particular, while shopping cart 67B is being inserted inside shopping cart 67A, the front portion of basket 30A causes the gate and seat assembly 36 to be disposed in a fully raised position (shown in FIG. 5B). This causes the handle 34 of the shopping cart 67 to travel up the inclined portions 60 of the cam members 58 of the gate and seat assembly 36 and, therefore, lift the rear caster wheels of the shopping cart 67 off the ground.

As shown in FIG. 5D, the handle 34 is locked in a close position in engagement with the notch portions 66 of the gate 42 of cart 67A. This allows, for example, the swivel caster wheels of the shopping cart 67 to control the path of movement of the entire nested assembly of shopping carts over the ground. The feature of the present invention is applicable to any number of shopping carts that are nested together so long as at least three carts are nested together.

Figures 6, 7A, 7B:
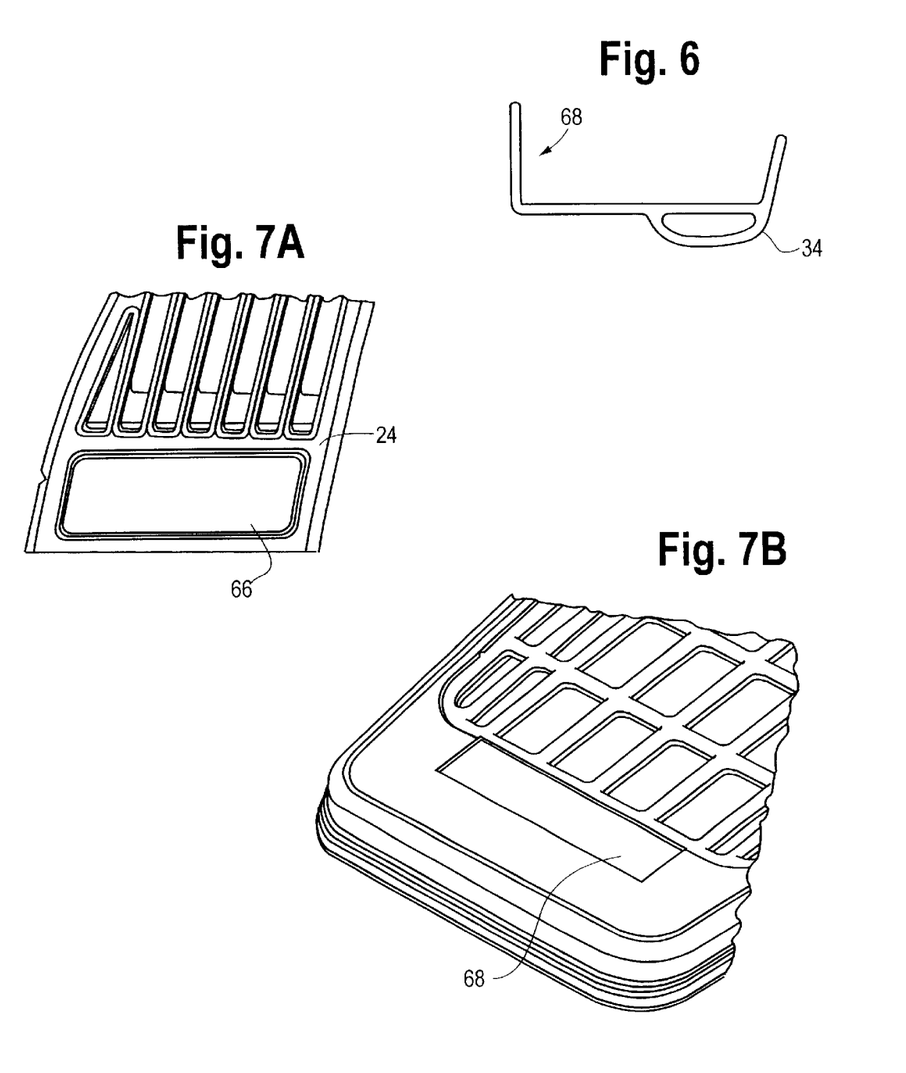
FIG. 6 is a section view of plastic shopping cart 10 taken along line 6—6 in FIG. 1.
FIGS. 7A and 7B are plan and perspective views of exemplary portions of plastic shopping cart 10 that are provided with an insert molded advertising logo.

Referring to FIG. 6, a section view of plastic shopping cart 10 taken along line 6—6 in FIG. 1 is shown. A storage compartment 68 is integrally formed as a portion of the handle 34 as handle 34 is formed. Various small items such as, for example, keys, a wallet or change can be stored in the storage compartment 68. This aspect of the present invention provides a number of distinct advantages such as, for example, providing significant additional structure integrity to the storage compartment over that which would be the case if a separate storage compartment were bolted onto a shopping cart handle.

FIGS. 7A and 7B illustrate an additional aspect of the present invention disclosed in this application. In particular, FIGS. 7A and 7B are plan and perspective views of exemplary portions of the plastic shopping cart 10 shown in FIG. 1 in which a decorative badge 69A or 69B can be provided. In the illustrated embodiment of the invention, the decorative badge 69A (FIG. 7A) is formed in the close-out panel 24, and the decorative badge 69B (FIG. 7B) is formed in a front portion of bottom carrier 22. In both examples discussed above, decorative badges 69A and 69B are formed their substrate carriers by means of an insert molding technique.

Figure 8A:
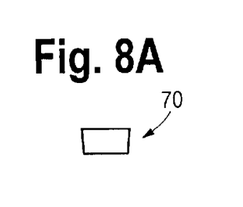
FIG. 8A is a section view of a prior art support rod that forms a part of a plastic shopping cart basket.
Figure 8B:
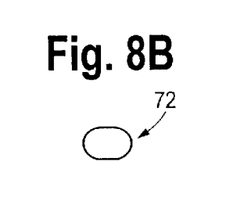
FIG. 8B is a section view of a portion of the plastic basket 30 shown in FIG. 2.

Referring to FIG. 8A, a sectional view of what is understood to be one of the support members that form a portion of a prior art plastic basket is shown. Prior art support member 70 includes four sharp corner portions as shown. This is undesirable because, for example, of the risk of injury to a user or to a small child that is carried inside a prior art plastic basket. In particular, the sharpness of the corner portions may cause significant cuts and abrasions. In order to reduce the risk that this may happen, the support members that form the plastic basket 30 shown in FIG. 2 are formed with rounded corner portions. One such support member 72 is shown in FIG. 8B.

Figure 9A:
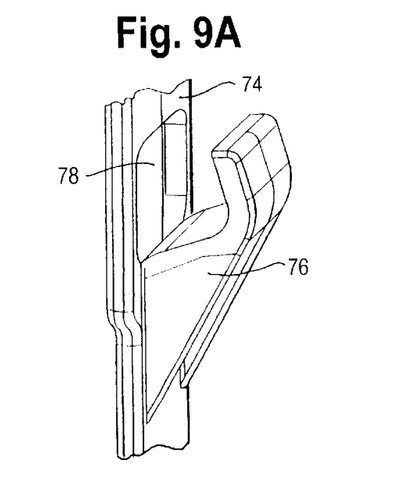
FIGS. 9A–9B are front and rear perspective views of central support member 74 that forms a portion of the swing gate 42 and illustrate a hanging attachment 76.
Figure 9B:
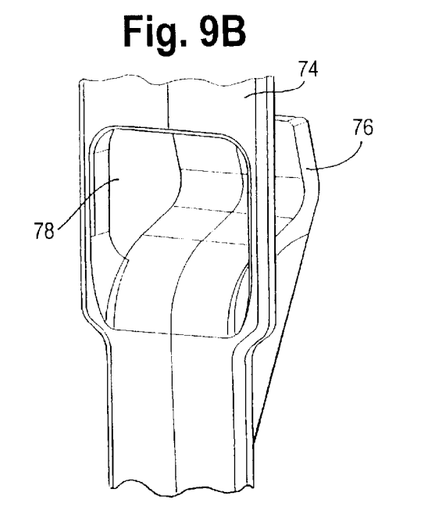

Referring now to FIGS. 9A–9B, front and rear perspective views of central support member 74 that forms a portion of the swing gate 42 (FIG. 2) and illustrate a hanging attachment 76. In the illustrated embodiment of the invention, an L-shaped member 76 and an aperture 78 are integrally formed as portions of the central support member aperture 74 as it is formed. The L-shaped member 76 and the aperture 78 allow items such as, for example, a purse, coat or the like to be hung from the L-shaped member 76. It should be understood that, for example, the L-shaped member 76 can be formed in any manner or shape desired, so long as it is formed during the formation process of the central support member 74.

Figure 10A:
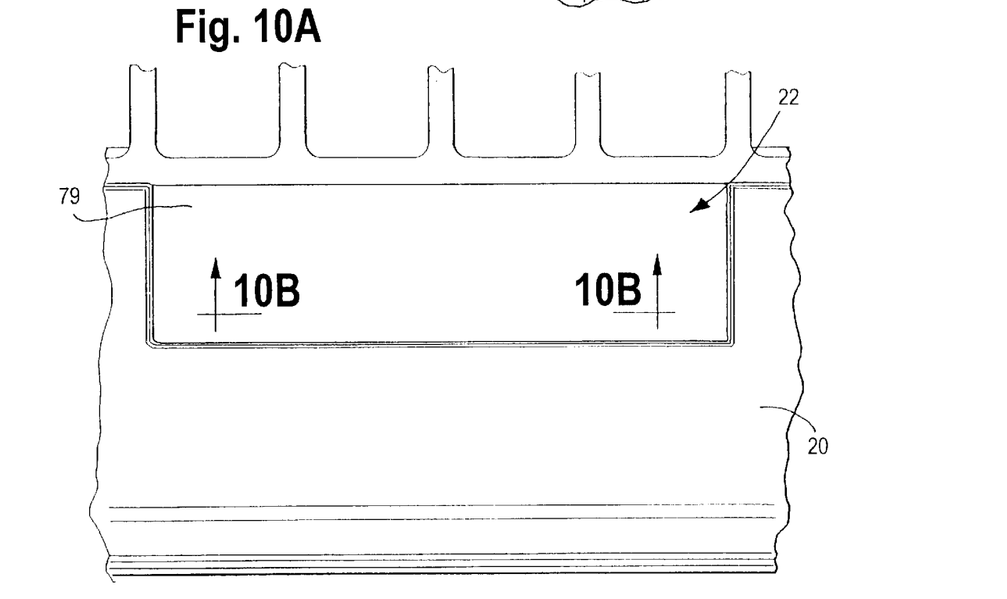
FIG. 10A is a plan view of a front portion of the chassis and bottom carrier shown in FIG. 1.
Figure 10B:
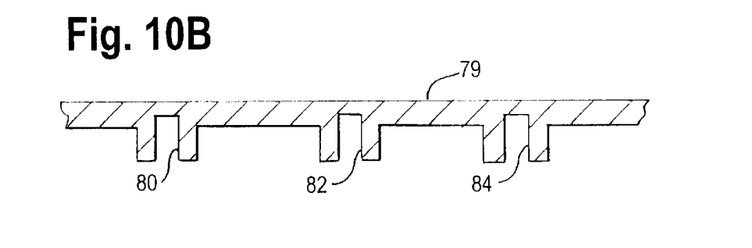
FIG. 10B is a section view of the front portion 79 of the chassis 20 and bottom carrier 22 that is taken along lines 10B—10B of FIG. 10A.

FIGS. 10A–10B illustrate a further aspect of the present invention. Referring to FIG. 10A, a plan view of a front portion of the chassis 20 and the bottom carrier 22 is shown. FIG. 10B is a section view of the front portion of the chassis and bottom carrier section that is taken along lines 10B—10B of FIG. 10A. The front portion 79 of the bottom carrier 22 forms a living hinge, and includes a plurality of mountings 80, 82, and 84. In the illustrated embodiment of the invention, the mountings 80, 82, and 84 are threaded and adapted to receive a corresponding screw (not shown) that attach the chassis 20 to the bottom carrier 22. One innovative feature of this aspect of the present invention is that the means by which the chassis 20 and the bottom carrier are connected together (screws, rivets, or the like) are disposed on the underside thereof. This provides a number of distinct advantages such as, for example, significantly reducing the corrosion and rusting of the typically metal fasteners that are used to attach the chassis 20 and the bottom carrier 22 together.

Figure 11A:
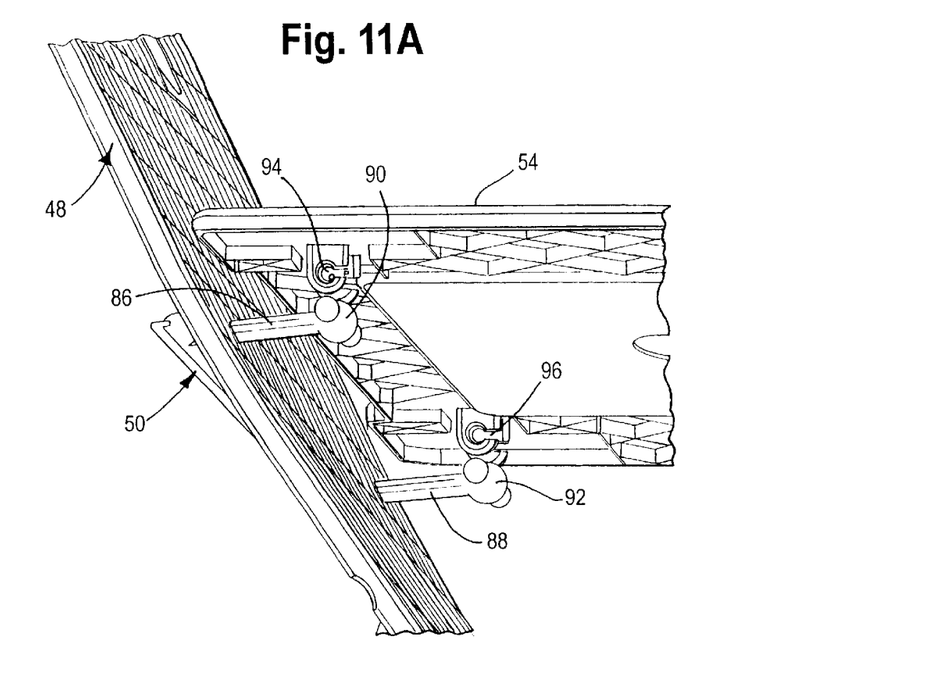
FIGS. 11A–11B are perspective views showing how the seat 52 is rotatably connected to the seat bracket 54.
Figure 11B:
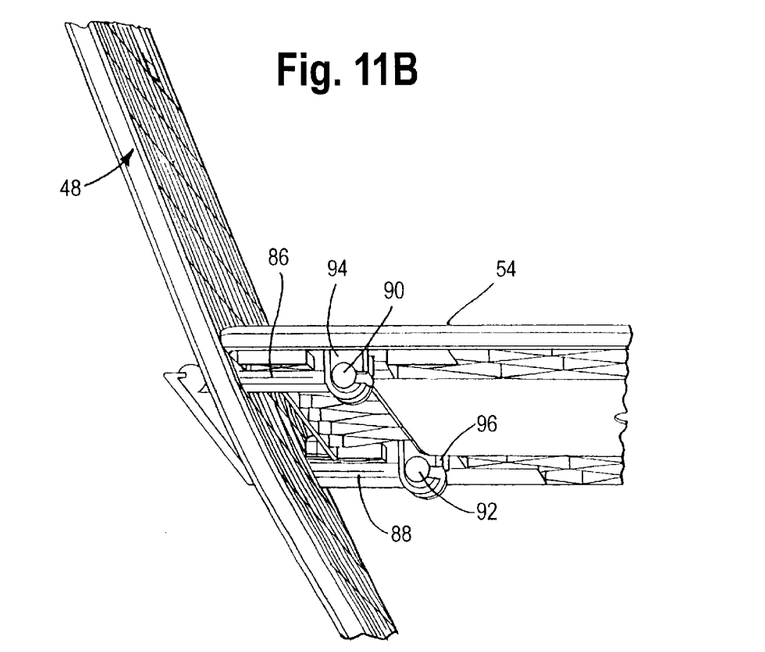

FIGS. 11A–11B are perspective views showing how the seat 52 is rotatably connected to the seat bracket 54. As illustrated in FIG. 11A, post members 86 and 88 of the seat bracket 50 are inserted through openings in the backrest 48. The seat bracket 50 includes two knurled connecting members 90 and 92 that are adapted to be engaged with corresponding C-clamp members 94 and 96 that are disposed on the underside of seat 54 as shown in FIG. 11B. In a locked condition, the C-clamp members 94 and 96 allow the knurled connecting members 90 and 92 to rotate about the axis defined between the C-clamp members. The C-clamp members 94 and 96 are integrally formed as a portion of the seat 54 as the seat is formed. The knurled connecting members 90 and 92 also are integrally formed as a portion of the seat bracket 50 as it is formed.

Figure 12:
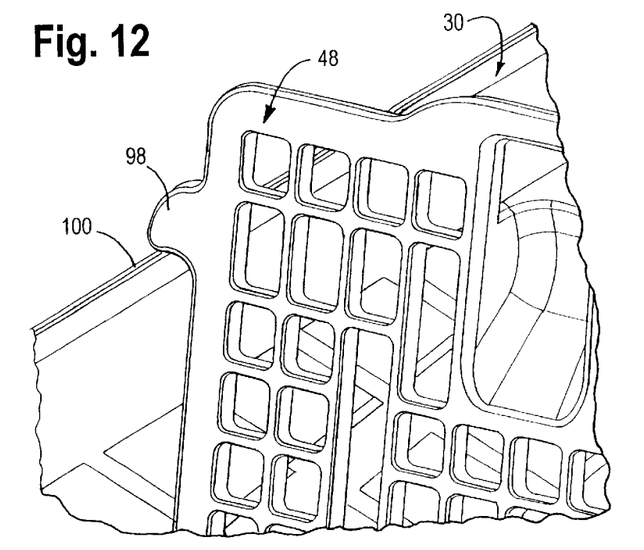
FIG. 12 is an enlarged, perspective view of a portion of the shopping cart 10 shown in FIG. 1.

FIG. 12 is an enlarged, perspective view of a portion of the shopping cart 10 shown in FIG. 1. In particular, and in the illustrated embodiment of the invention, backrest 48 includes a contoured tab portion 98 that is integrally formed as a portion of the backrest 48. The contoured tab portion 98 engages the top edge 100 of the plastic basket 30, and slidably moves along its top edge 100. This facilitates movement of the gate and seat assembly 36 from an initial, at-rest position (FIG. 3 or FIG. 5A) to an extended position (FIG. 5D).

Figure 13A:
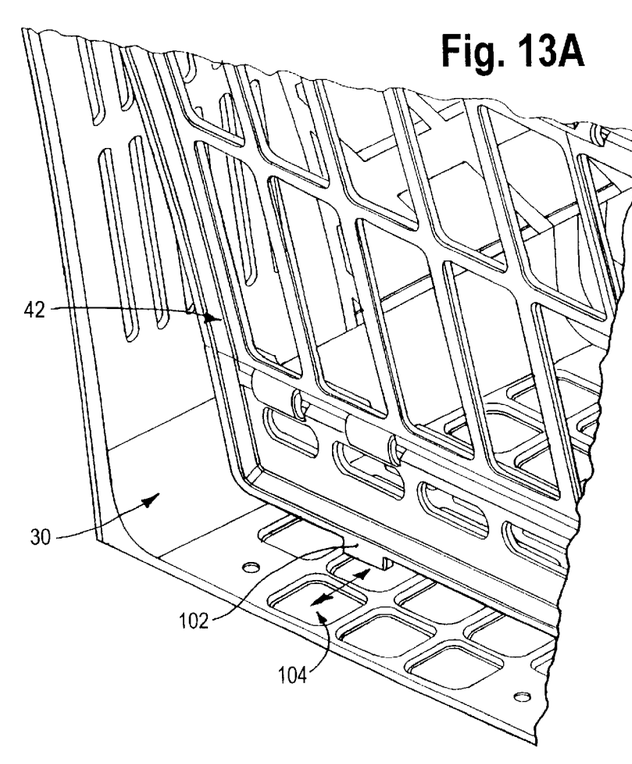
FIGS. 13A–13B are enlarged, perspective views of the basket 30 and the swing gate 42.
Figure 13B:
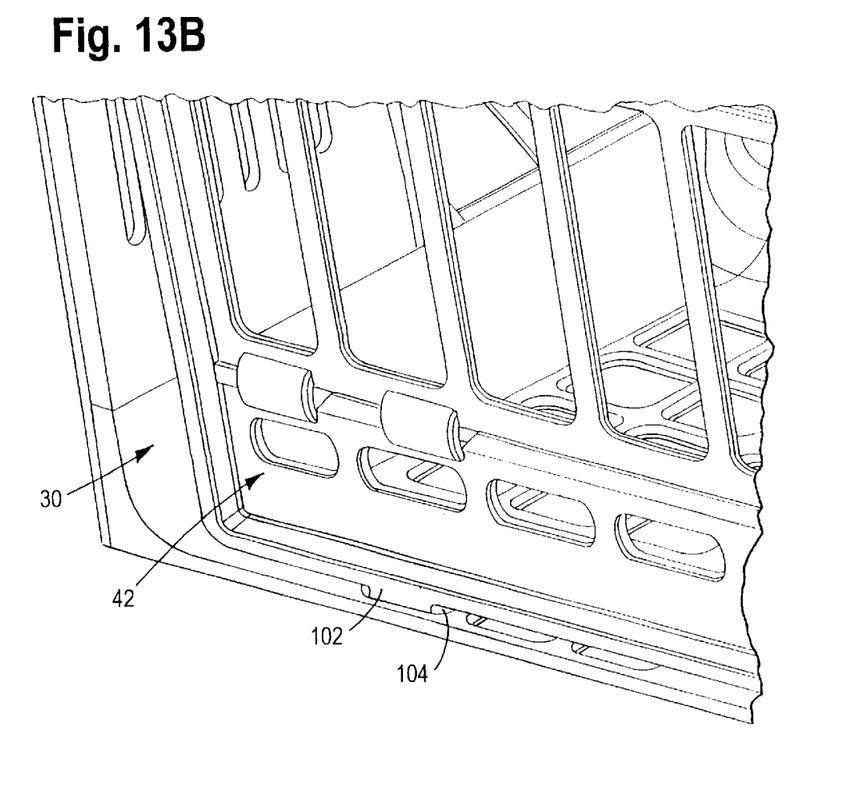

FIGS. 13A–13B are enlarged, perspective views of the basket 30 and the swing gate 42 that show how the swing gate 42 engages with basket 32. In the illustrated embodiment of the invention, a plurality of tabs 102 extend away from a distal end of the swing gate 42 that cooperate with apertures 104 formed in the basket 30 as shown. The apertures 104 are sized so that the swing gate 42 may rotate about the axis 68 (FIG. 5B) until the tabs 102 engage the plastic basket 30 as shown in FIG. 13B. It should be noted that the swing gate 42 is oriented with respect to the plastic basket 30 so that it is disposed in the position shown in FIG. 13B, unless it is moved.

Figure 14:
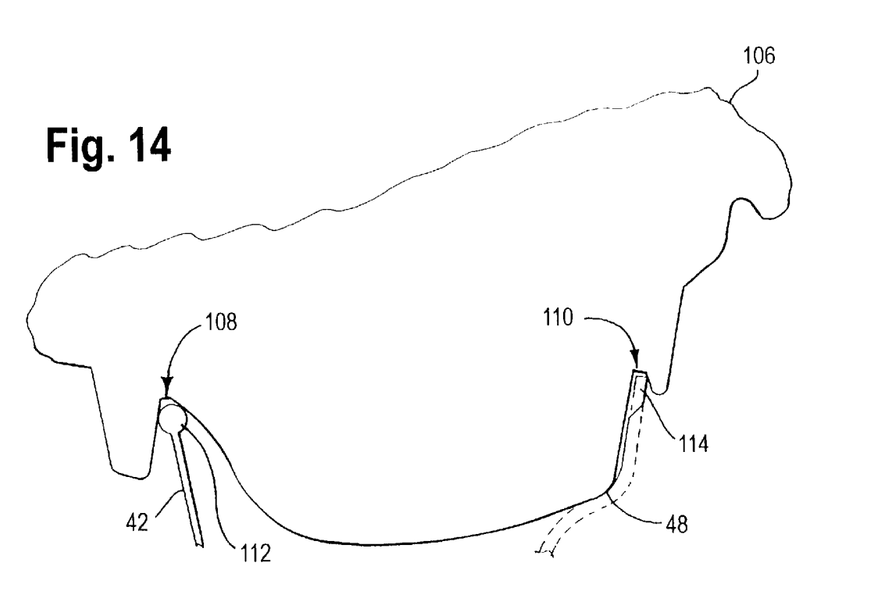
FIG. 14 is an expanded side view of a portion of swing gate 42 and backrest 48 that are configured in accordance with an aspect of the present invention that allows a baby car seat or the like to be mounted on the plastic shopping cart 10 as schematically shown in FIG. 14.

FIG. 14 is an expanded side view of a portion of swing gate 42 and backrest 48 that are configured in accordance with an aspect of the present invention that allows a baby car seat 106 or the like to be mounted on the plastic shopping cart 10 as schematically shown in FIG. 14. Baby car seats typically include first and second notches 108 and 110 located on the bottom portion thereof. In accordance with this aspect of the present invention, upper portion 112 of back rest 42 is adapted to be received in first notch portion 108, and an upper portion 114 of swing gate 48 is adapted to be locked into second notch 110. In this regard, second notch 110 includes a latch member 116 that may be forced into engagement with portion 114 of swing gate 48.

Figures 15, 16:
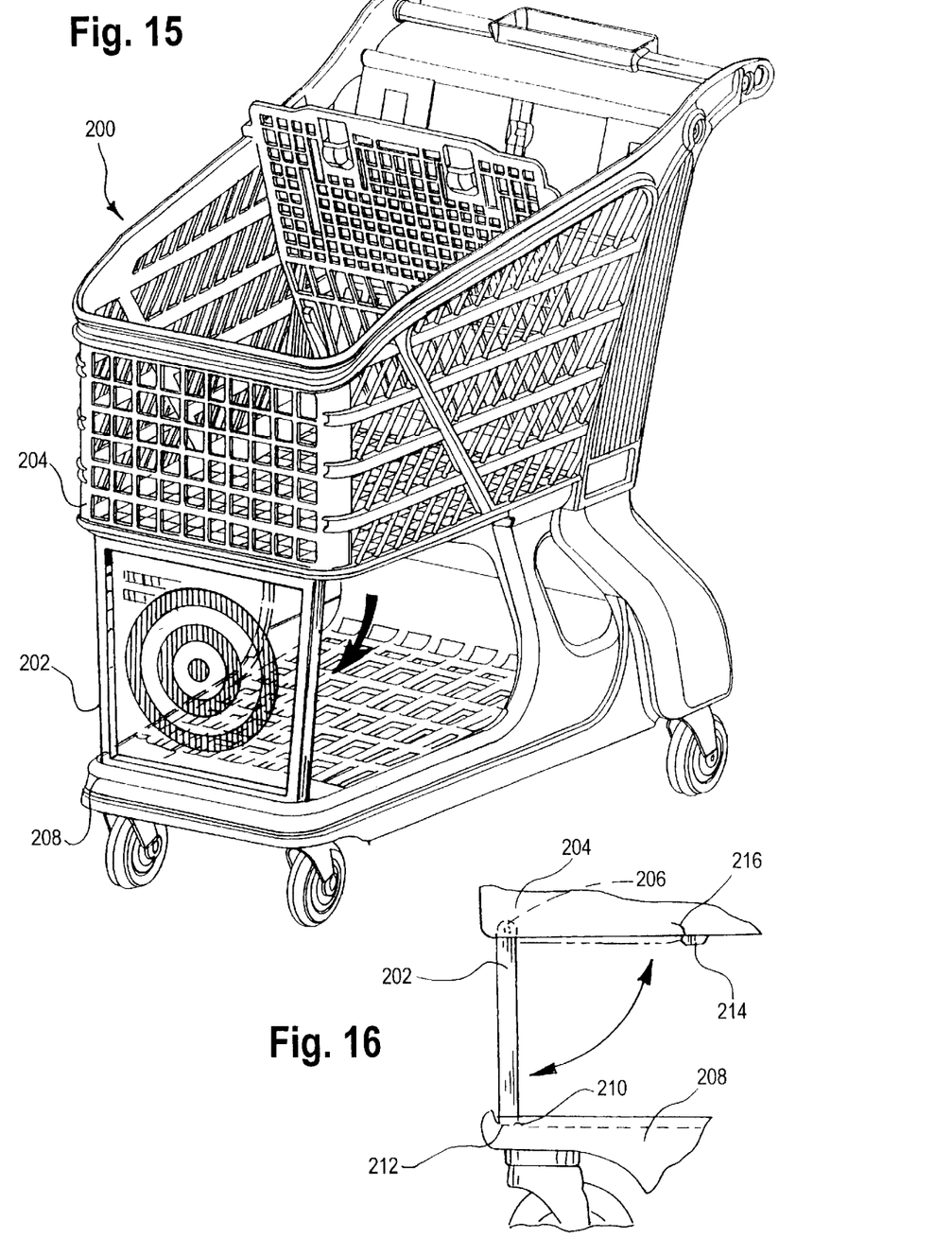
FIG. 15 is a perspective view of a further embodiment of a plastic shopping cart that is manufactured in accordance with a number of aspects of the present invention.
FIG. 16 is a side view of a portion of the plastic shopping cart that is shown in FIG. 15.

FIG. 15 shows a further embodiment of a plastic shopping cart that is manufactured in accordance with a number of aspects of the present invention disclosed in this application. In the embodiment of the present invention that is illustrated in FIG. 15, plastic shopping cart 200 includes a rotatable support member 202 that is pivotally mounted to the bottom of basket 204. Support member is pivotable about the longitudinal axis of the pivot rod 206 (FIG. 16). In FIGS. 15 and 16, the support member 202 is shown as being disposed in the down and locked position against the wheeled based 208. This provides a number of significant advantages such as, for example, the fact that the load carrying capacity of basket 204 is significantly increased due to the extra support that is provided by the additional connection that is provided between the basket 204 and wheeled base 208 by the support member 202. In one application, for example, the shopping cart 200 could be used to easily move a plurality of over 50 pound bags of cement or potting soil that are disposed in the basket 204.

In the embodiment of the invention illustrated in FIG. 16, plastic shopping cart 200 includes a first detent 210 and a first recess 212 that are formed in the wheeled base 208. Shopping cart 200 also includes, in this embodiment, a second detent 214 as well as a second recess 216 that are formed in the bottom of the basket 204. In order to dispose the support member 202 in the support position shown in solid line in FIGS. 15–16, or to dispose it in the not deployed position shown in phantom in FIG. 16, a user applies light pressure to the support member 202 that is sufficient to overcome the force that is applied to the support member by the detents 210 or 214. When disposed in the support position shown in FIG. 15, and when a load is carried in the basket 204, the weight of the load 204 causes the support member 202 to be firmly fixed within the recess 212.

In one exemplary application, the detents 210 and 214 and recesses 212 and 216 are integrally formed as a portion of the basket 204 in connection with a molding operation, and the support member 202 has the shape illustrated in FIG. 15. However, it should be understood that the subject matter shown in FIGS. 15–16 is exemplary in nature and, therefore, that the support member could have a different shape, it could be attached to the basket 204 in a different way, or it could be secured in the support position by, for example, a separate locking mechanism. Such alternatives should be readily apparent to those of ordinary skill in the relevant art in connection with the teachings of this application.

Figure 17:
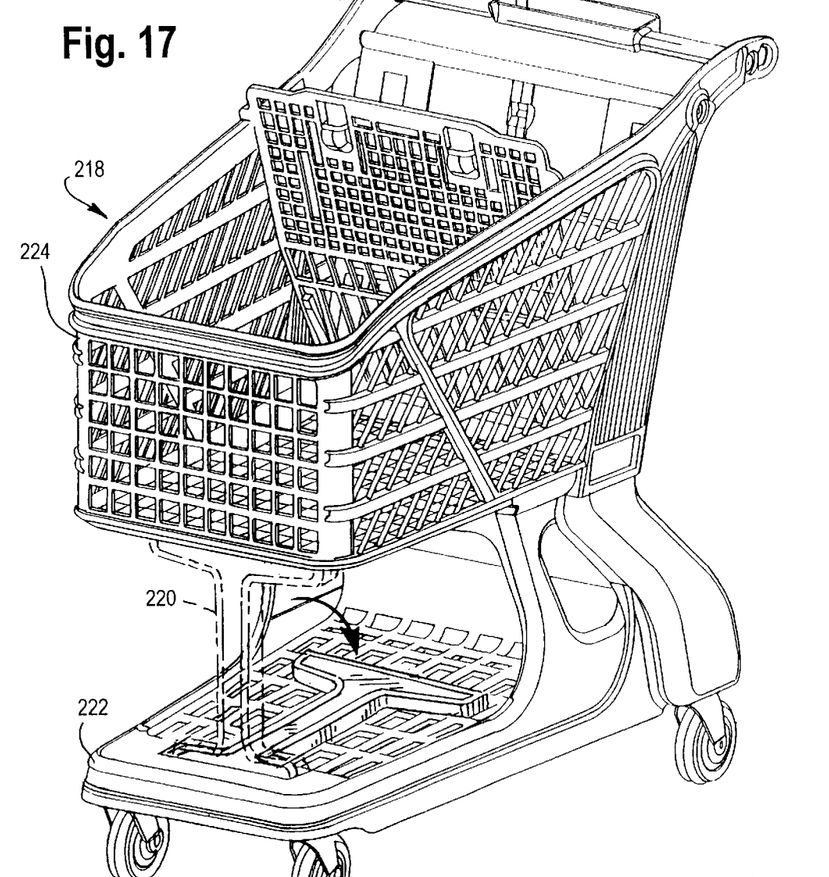
FIG. 17 is a still further embodiment of a plastic shopping cart that is manufactured in accordance with a number of aspects of the present invention.
Figure 18:
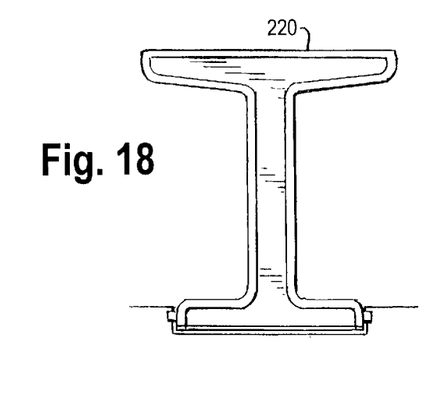
FIG. 18 is a front elevational view of the support member shown in FIG. 17.

FIG. 17 illustrates a further exemplary embodiment of a plastic shopping cart that is manufactured in accordance with a number of aspects of the present invention. In the embodiment of the invention illustrated in FIG. 17, a plastic shopping cart 218 includes a rotatable support member 220 that is pivotably mounted to a wheeled base 222. In this example, the support member 220 is disposed in a non-deployed position shown in solid line in FIG. 17, wherein it is disposed within a recess formed in the wheeled base 222. A front elevational view of the support member 220 is shown in FIG. 18.

Figure 19:
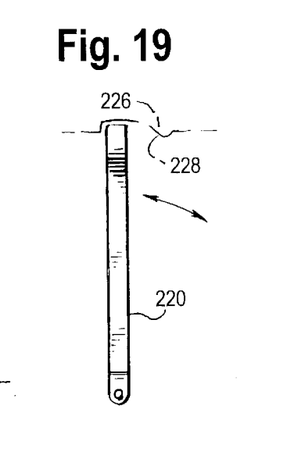
FIG. 19 is a side view of a portion of the plastic shopping cart shown in FIG. 17.

In order to, for example, increase the load carrying capacity of the basket 224, the rotatable support member 220 can be rotated to the support position shown in phantom in FIG. 17. A recess 226 and a detent 228 are, in accordance with one exemplary application, integrally formed as a portion of the basket 224 when it is manufactured. In order to dispose the rotatable support member 220 in the upright supporting position shown in phantom FIG. 17, a user applies light pressure to the support member 220 that is sufficient to overcome the force that is applied to the support member by the detent 228. When disposed in the support position shown in FIG. 19, and when a load is carried in the basket 224, the weight of the load in the basket 224 causes the support member 220 to be firmly fixed within the recess 226.

From the foregoing, it will also be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims when the claims are properly interpreted.

What is claimed is:

1. A plastic shopping cart, comprising:
a chassis having at least one front wheel and at least one rear wheel;
a basket mounted on said chassis, said basket including a bottom wall, a front wall, and first and second side walls, said bottom, front, and first and second side walls being integrally formed as a portion of each other, said basket being formed by molding a thermoplastic resin;
a gate and seat assembly that includes a swing gate, a seat, and a back rest, and that is rotatably mounted on said basket about an axis, said gate and seat assembly being disposed in an initial position in which said gate and seat assembly cooperates with said first and second side walls and said front wall to define a generally enclosed space in which goods can be stored, said gate and seat assembly being rotatable about said axis from said initial position in a direction towards said front wall to a raised position, said back rest being molded from a thermoplastic resin and including at least one raised cam member integrally formed as a portion thereof; and
wherein when at least first, second, and third ones of said shopping carts are nested together, (1) said first shopping cart causes the gate and seat assembly of said second cart to be disposed in a raised position, and (2) the at least one cam member of the gate and seat assembly of said second shopping cart lifts a handle of said third shopping cart off the ground and locks said handle member is a raised position, whereby said at least one rear wheel of said third shopping cart is raised off the ground to allow the at least first, second, and third carts to be easily moved.

2. The shopping cart of claim 1 wherein said chassis is formed from a thermoplastic resin.

3. The shopping cart of claim 1 wherein said gate and seat assembly includes at least one support member, a hook member being integrally formed as a portion of said at least one support member.

4. The shopping cart of claim 1 wherein said gate and seat assembly includes first and second mounting portions that are adapted to be received in corresponding portions of a baby car seat.

5. The shopping cart assembly of claim 1 wherein said back rest and swing gate are rotatable with respect to each other about an axis that is generally parallel to said front wall, said seat being mounted on said swing gate for rotation about an axis that is generally parallel to said front wall, said gate and seat assembly further including a seat bracket that cooperates with said seat to limit the rotation of said swing gate with respect to said back rest.

6. The shopping cart of claim 5 wherein said seat bracket includes at least two connectors and said seat includes two connectors, said seat bracket connectors being integrally formed as a portion of said seat bracket, and said seat connectors being integrally formed as a portion of said seat.

7. The shopping cart of claim 6 wherein said seat bracket connectors are generally C-shaped.

8. The shopping cart of claim 1 wherein said handle includes a storage compartment that is integrally formed as a portion thereof.

9. The shopping cart of claim 1 further comprising a support member that is attached to one of said basket and said chassis, said support member being adapted to provide support to an end portion of said basket by thereby increasing the effective load carrying capacity of said shopping cart.

10. The shopping cart of claim 9 wherein said support member is mounted on said chassis.

11. The shopping cart of claim 9 wherein said support member is mounted on said basket.

12. The shopping cart of claim 9 wherein said support member is I-shaped.

13. The plastic shopping cart of claim 12 wherein said support member includes a first support member that is parallel to said chassis, a second support member that is adapted to the disposed parallel to said basket, and a third support member that is integrally formed with said first and second support members, the third support member being generally perpendicular to said first and second support member.

14. The plastic shopping cart of claim 9 wherein said support member comprises one or more supports that are disposable in an initial non-supporting position with respect to one of said chassis and said basket, and is disposable in a supporting position, wherein a direct connection is caused to occur between a portion of said basket, said support member, and said chassis.

* * * * *